US011648954B2

(12) United States Patent
Zhou et al.

(10) Patent No.: US 11,648,954 B2
(45) Date of Patent: May 16, 2023

(54) CONTROL METHOD OF UNMANNED VEHICLE AND UNMANNED VEHICLE

(71) Applicant: Beijing Sankuai Online Technology Co., Ltd, Beijing (CN)

(72) Inventors: Mo Zhou, Beijing (CN); Huaxia Xia, Beijing (CN)

(73) Assignee: Beijing Sankuai Online Technology Co., Ltd, Beijing (CN)

( * ) Notice: Subject to any disclaimer, the term of this patent is extended or adjusted under 35 U.S.C. 154(b) by 88 days.

(21) Appl. No.: 17/278,341

(22) PCT Filed: Jun. 17, 2019

(86) PCT No.: PCT/CN2019/091516
§ 371 (c)(1),
(2) Date: Mar. 22, 2021

(87) PCT Pub. No.: WO2020/057197
PCT Pub. Date: Mar. 26, 2020

(65) Prior Publication Data
US 2022/0032930 A1 Feb. 3, 2022

(30) Foreign Application Priority Data

Sep. 21, 2018 (CN) .......................... 201811106845.3
Sep. 21, 2018 (CN) .......................... 201821549567.4

(51) Int. Cl.
*B60W 50/02* (2012.01)
*B60W 60/00* (2020.01)
(Continued)

(52) U.S. Cl.
CPC ........ *B60W 50/0225* (2013.01); *B60W 40/02* (2013.01); *B60W 50/0205* (2013.01);
(Continued)

(58) Field of Classification Search
CPC ......... B60W 50/0225; B60W 60/0016; B60W 40/02; B60W 50/0205; B60W 50/029;
(Continued)

(56) References Cited

U.S. PATENT DOCUMENTS

| 10,286,923 | B1* | 5/2019 | Hattab | ................. | B60W 40/10 |
| 2017/0006225 | A1* | 1/2017 | Fu | .......................... | B60R 11/04 |

(Continued)

FOREIGN PATENT DOCUMENTS

| CN | 101901527 B | 4/2012 |
| CN | 105357237 A | 2/2016 |

(Continued)

OTHER PUBLICATIONS

ISA State Intellectual Property Office of the People's of China, International Search Report Issued in Application No. PCT/CN2019/091516, dated Sep. 18, 2019, WIPO, 4 pages.

(Continued)

*Primary Examiner* — Nicholas Kiswanto
*Assistant Examiner* — Jamal A Shah
(74) *Attorney, Agent, or Firm* — Kilpatrick Townsend & Stockton LLP (57) ABSTRACT

Embodiments of the present disclosure provide a control method of an unmanned vehicle and an unmanned vehicle, which have excellent safety. The control method of the unmanned vehicle includes: detecting vibration information and running attitude information of the unmanned vehicle; according to the vibration information, the running attitude information and a running status of the unmanned vehicle, determining a condition of the unmanned vehicle, wherein the running status of the unmanned vehicle includes a stop status and a driving status; and when the condition of the unmanned vehicle is abnormal, controlling the unmanned vehicle according to an abnormal condition coping strategy.

17 Claims, 3 Drawing Sheets

(51) Int. Cl.
  *B60W 40/02* (2006.01)
  *B60W 50/029* (2012.01)
  *G05D 1/02* (2020.01)
  *G07C 5/08* (2006.01)
  *G07C 5/00* (2006.01)

(52) U.S. Cl.
  CPC ...... *B60W 50/029* (2013.01); *B60W 60/0016* (2020.02); *G05D 1/027* (2013.01); *G07C 5/008* (2013.01); *G07C 5/0816* (2013.01); *B60W 2050/021* (2013.01); *B60W 2050/0215* (2013.01); *B60W 2556/45* (2020.02); *G05D 2201/0213* (2013.01)

(58) Field of Classification Search
  CPC ....... B60W 2556/45; B60W 2050/021; B60W 2050/0215; G05D 1/027; G05D 2201/0213; G07C 5/008; G07C 5/0816
  See application file for complete search history.

(56) References Cited

U.S. PATENT DOCUMENTS

| | | | |
|---|---|---|---|
| 2017/0154481 A1 | 6/2017 | Chen et al. | |
| 2017/0358151 A1 | 12/2017 | Koons et al. | |
| 2018/0194364 A1 | 7/2018 | Asakura et al. | |
| 2019/0108692 A1* | 4/2019 | Du | B60W 50/14 |

FOREIGN PATENT DOCUMENTS

| | | |
|---|---|---|
| CN | 106094830 A | 11/2016 |
| CN | 107735302 A | 2/2018 |
| CN | 109324618 A | 2/2019 |
| CN | 208673148 U | 3/2019 |
| DE | 102013111392 A1 | 4/2015 |
| EP | 2837919 A2 | 2/2015 |
| JP | 2016078530 A | 5/2016 |
| WO | 2014116197 A1 | 7/2014 |

OTHER PUBLICATIONS

European Patent Office, Extended European Search Report Issued in Application No. 19862424.9, dated Aug. 16, 2021, Germany, 8 pages.

ISA State Intellectual Property Office of the People's Republic of China, Written Opinion of the International Searching Authority Issued in Application No. PCT/CN2019/091516, dated Sep. 18, 2019, WIPO, 11 pages.

* cited by examiner

CONTROL METHOD OF UNMANNED VEHICLE AND UNMANNED VEHICLE

CROSS REFERENCES

The present application is a US National Stage of International Application No. PCT/CN2019/091516, filed Jun. 17, 2019, which claims priority to Chinese Patent Application No. 201811106845.3 and Chinese Patent Application No. 201821549567.4, filed with the Chinese Patent Office on Sep. 21, 2018, which are hereby incorporated by reference in their entireties.

TECHNICAL FIELD

The present disclosure relates to a control method of an unmanned vehicle and an unmanned vehicle.

BACKGROUND

With the development of unmanned driving technologies, unmanned vehicles have been widely used in the field of commodity distribution. For unmanned vehicle distribution, how to realize control is particularly important.

SUMMARY

Embodiments of the present disclosure aim at providing a control method of an unmanned vehicle and an unmanned vehicle, which have excellent safety.

One aspect of the embodiments of the present disclosure provides a control method of an unmanned vehicle. The control method of an unmanned vehicle includes: detecting vibration information and running attitude information of the unmanned vehicle; according to the vibration information, the running attitude information and a running status of the unmanned vehicle, determining a condition of the unmanned vehicle, wherein the running status of the unmanned vehicle includes: a stop status and a driving status; and when the condition of the unmanned vehicle is abnormal, controlling the unmanned vehicle according to an abnormal condition coping strategy.

Another aspect of the embodiments of the present disclosure provides an unmanned vehicle. The unmanned vehicle includes: a vibration sensor configured to detect vibration information of the unmanned vehicle; an inertial sensor configured to detect running attitude information of the unmanned vehicle; and a controller electrically connected to the vibration sensor and the inertial sensor respectively; wherein the controller is configured to, according to the vibration information, the running attitude information and a running status of the unmanned vehicle, determine a condition of the unmanned vehicle, wherein the running status of the unmanned vehicle includes: a stop status and a driving status; and when the condition of the unmanned vehicle is abnormal, control the unmanned vehicle according to an abnormal condition coping strategy.

According to the control method of an unmanned vehicle disclosed by the embodiments of the present disclosure, the controller determines the condition of the unmanned vehicle according to the vibration information, the running attitude information and the running status of the unmanned vehicle, which can eliminate misjudgment of the controller caused by the vibration information with larger vibration amplitude detected by the vibration sensor due to factors such as bumping, acceleration and deceleration, resonance and the like during the running of the unmanned vehicle, so that the condition of the unmanned vehicle can be judged more accurately and the safety is improved.

DETAILED DESCRIPTION OF THE EMBODIMENTS

Exemplary embodiments are described in detail herein, and examples of the exemplary embodiments are shown in the accompanying drawings. When the following description involves the accompanying drawings, unless otherwise indicated, the same numerals in different accompanying drawings represent the same or similar elements. The implementations described in the following exemplary embodiments do not represent all implementations consistent with the present disclosure. On the contrary, the implementations are merely examples of apparatuses and methods that are described in detail in the appended claims and that are consistent with some aspects of the embodiments of the present disclosure.

The terms used in this disclosure are merely for the purpose of describing specific embodiments, and are not intended to limit the present disclosure. Unless otherwise defined, the technical terms or scientific terms used herein should have general meanings understood by a person of ordinary skill in the field of the present disclosure. "First", "second" and similar terms used in the specification and the claims of the present disclosure do not indicate any sequence, quantity, or importance, but are only used to distinguish different components. Similarly, "one", "a", and similar terms also do not indicate a quantity limitation, but indicates that there is at least one. The "a plurality of" and "several" represent two or more than two. Unless otherwise indicated, "front part", "rear part", "lower part" and/or "upper part" and similar terms are for convenience of description only, and are not limited to one position or one spatial orientation. "Including" or "containing" and similar terms mean that the elements or articles appearing before "including" or "containing" cover the listed elements or articles appearing after "including" or "containing" and equivalents thereof, and do not exclude other elements or articles. "Connection", "connected", and similar terms are not limited to a physical or mechanical connection, but may include an electrical connection, regardless of a direct or indirect connection. The terms "a", "said" and "the" of singular forms used in the specification of the present disclosure and the appended claims are also intended to include plural forms, unless otherwise specified in the context clearly. It should be further understood that the term "and/or" used herein indicates and includes any or all possible combinations of one or more associated listed items.

In an embodiment, a vibration sensor is mounted on an unmanned vehicle to detect a vibration intensity of a specific part of the unmanned vehicle, and determine whether the detected vibration intensity exceeds a preset vibration intensity threshold, thereby judging a condition of the unmanned vehicle. When the vibration intensity exceeds the preset vibration intensity threshold, the unmanned vehicle gives an alarm. When the preset vibration intensity threshold is low, the unmanned vehicle may misreport information. When the preset vibration intensity threshold is high, the unmanned vehicle may fail to report a theft event.

Figure 1:
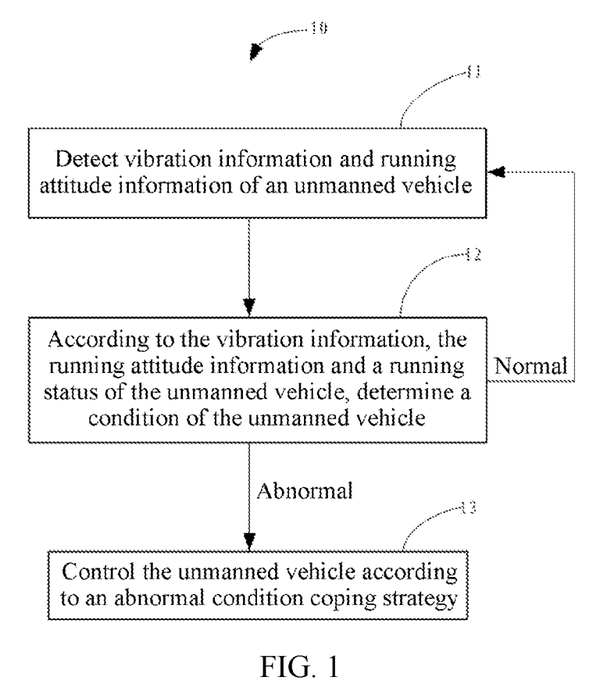
FIG. 1 is a flow chart of a control method of an unmanned vehicle according to an embodiment of this application.

FIG. 1 is a flow chart of a control method 10 of an unmanned vehicle according to an embodiment. The control method 10 of an unmanned vehicle is used to protect the unmanned vehicle from being destroyed or stolen during use, and includes steps 11 to 13. In step 11, vibration information and running attitude information of the unmanned vehicle are detected. In an embodiment, a vibration sensor is configured to detect the vibration information of the unmanned vehicle, and an inertial sensor is configured to detect the running attitude information of the unmanned vehicle. The unmanned vehicle may be provided with one or more vibration sensors, which may be distributed at key parts of the unmanned vehicle to detect vibration information of the key parts of the unmanned vehicle in real time and transmit the detected vibration information to a controller. The key parts of the unmanned vehicle include a door or a cover of the unmanned vehicle, a body, and parts nearby a plurality of sensors (including laser radar, millimeter wave radar and camera). At least one vibration sensor is arranged at the door or the cover, the plurality of vibration sensors may be arranged on the body, and one vibration sensor may be respectively arranged near each sensor. Each vibration sensor transmits the detected vibration information to the controller.

The inertial sensor may be arranged at a center position or a central axis of the unmanned vehicle. The inertial sensor is configured to detect the running attitude information of the unmanned vehicle such as acceleration, angular velocity, inclination, impact, vibration and rotation, and transmit the detected running attitude information to the controller. In the embodiment of the present disclosure, the running attitude information includes the vibration information due to the movement of the unmanned vehicle, which is further determined according to the acceleration and the angular velocity of the unmanned vehicle detected by the inertial sensor. The vibration information may include a vibration direction and a vibration amplitude.

In step 12, according to the vibration information, the running attitude information and a running status of the unmanned vehicle, a condition of the unmanned vehicle is determined. The running status of the unmanned vehicle includes a stop status and a driving status.

Figure 2:
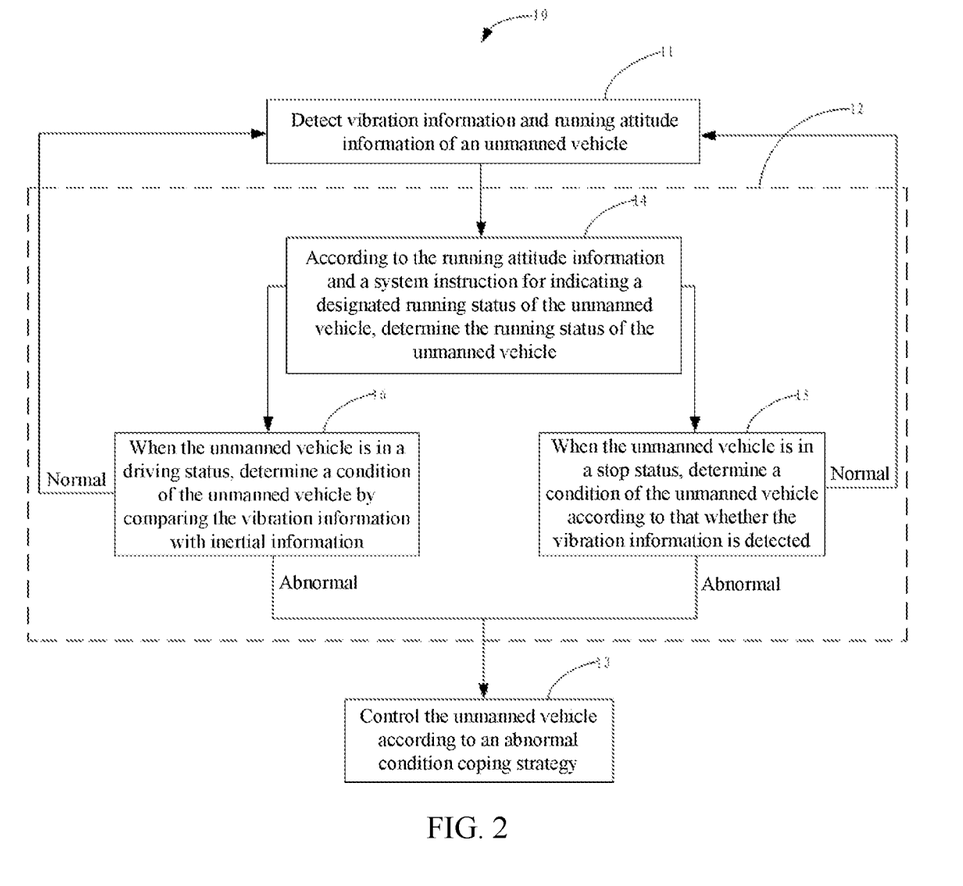
FIG. 2 is a flow chart of a control method of an unmanned vehicle according to another embodiment of this application.

FIG. 2 is a flow chart of a control method of an unmanned vehicle according to another embodiment. In the embodiment shown in FIG. 2, step 12 includes substeps 14 to 16. In substep 14, according to the running attitude information and a system instruction for indicating a designated running status of the unmanned vehicle, the running status of the unmanned vehicle is determined. The system instruction for indicating the designated running status of the unmanned vehicle includes driving direction and speed, and the like. Here, it is impossible to determine the running status of the unmanned vehicle according to the running attitude information and the system instruction alone. For example, when the unmanned vehicle is pushed, the system instruction shows that the unmanned vehicle is in the stop status, while the running attitude information shows that the unmanned vehicle is in the driving status. When the unmanned vehicle runs in a straight line at a constant speed, the system instruction shows that the unmanned vehicle is in the driving status, while the running attitude information shows that the unmanned vehicle is in the stop status. When both the system instruction and the running attitude information show that the unmanned vehicle is in the stopped status, the unmanned vehicle is in the stopped status.

In substep 15, when the unmanned vehicle is in the stop status, the condition of the unmanned vehicle is determined according to that whether the vibration information is detected. When a plurality of vibration sensors are arranged on the unmanned vehicle, it is considered that the vibration information is detected if any vibration sensor detects the vibration information.

When the unmanned vehicle is in the stop status, and the vibration information is detected, the condition of the unmanned vehicle is determined to be abnormal. When the unmanned vehicle is in the stop status, and no vibration information is detected, the condition of the unmanned vehicle is determined to be normal.

In substep 16, when the unmanned vehicle is in the driving status, the condition of the unmanned vehicle is determined by comparing the vibration information with the running attitude information. The vibration information includes: a first direction and a first vibration amplitude, and the running attitude information includes: a second direction and a second vibration amplitude. The first direction is the vibration direction detected by the vibration sensor on the unmanned vehicle, and the second direction is the vibration direction detected by the inertial sensor when the unmanned vehicle runs. When the first direction is different from the second direction, it indicates that the vibration sensor not only vibrates when the unmanned vehicle runs, but also vibrates under the action of other external forces, which makes the first direction different from the second direction. Therefore, when the first direction is different from the second direction, the condition of the unmanned vehicle is determined to be abnormal.

When the first direction is the same as the second direction, the condition of the unmanned vehicle is determined according to a difference between the first vibration amplitude and the second vibration amplitude. When the difference between the first vibration amplitude and the second vibration amplitude is greater than a vibration threshold, the condition of the unmanned vehicle is determined to be abnormal. When the difference between the first vibration amplitude and the second vibration amplitude is no more than a vibration threshold, the condition of the unmanned vehicle is determined to be normal. The controller determines the condition of the unmanned vehicle according to the vibration information, the running attitude information and the running status of the unmanned vehicle, which can eliminate misjudgment of the controller caused by the vibration information with larger vibration amplitude detected by the vibration sensor due to factors such as bumping, acceleration and deceleration, resonance and the like during the running of the unmanned vehicle, so that the condition of the unmanned vehicle can be judged more accurately and the safety is improved. The vibration threshold may be set according to long-term test conditions and other factors.

When a plurality of vibration sensors are arranged on the unmanned vehicle, the vibration information detected by the plurality of vibration sensors is respectively compared with the running attitude information. When the first direction is different from the second direction of any vibration information, the condition of the unmanned vehicle is determined to be abnormal. When the difference between the first vibration amplitude and the second vibration amplitude of any vibration information is greater than a vibration threshold, the condition of the unmanned vehicle is determined to be abnormal.

In step 13, when the condition of the unmanned vehicle is abnormal, the unmanned vehicle is controlled according to an abnormal condition coping strategy. The abnormal conditions of the unmanned vehicles include, but are not limited to that the unmanned vehicle is in a stolen status and the unmanned vehicle is in a destroyed status. The abnormal condition coping strategy includes at least one of: controlling an alarm on the unmanned vehicle to give an alarm, controlling the unmanned vehicle to avoid, controlling the unmanned vehicle to run in a curve, controlling the unmanned vehicle to accelerate, or controlling the unmanned vehicle to run to a designated station. Controlling the alarm on the unmanned vehicle to give an alarm means that when the condition of the unmanned vehicle is abnormal, the alarm is controlled to make a sound and/or shine to give an alarm so as to warn an intruder who is destroying or stealing the unmanned vehicle, and remind relevant personnel at the same time, so that the intruder cannot continue destroying or stealing the unmanned vehicle. The several coping strategies of controlling the unmanned vehicle to avoid, controlling the unmanned vehicle to run in the curve, controlling the unmanned vehicle to accelerate, and controlling the unmanned vehicle to run to the designated station belong to controlling the unmanned vehicle to avoid abnormal conditions. Controlling the unmanned vehicle to avoid means controlling the unmanned vehicle to move forward or backward for a certain distance when the condition of the unmanned vehicle is abnormal, so as to avoid the intruder, so that the intruder cannot continue destroying or stealing the unmanned vehicle. Controlling the unmanned vehicle to run in the curve means, when the condition of the unmanned vehicle is abnormal, controlling the unmanned vehicle to run in a curve path to avoid, such as running in an S-shaped route, which also makes it impossible for the intruder to continue destroying or stealing the unmanned vehicle. Controlling the unmanned vehicle to accelerate enables the unmanned vehicle to leave the current position as soon as possible, thus avoiding the unmanned vehicle from being destroyed or stolen continuously. Controlling the unmanned vehicle to run to the designated station means that the controller obtains a position and a route of the designated station nearest to the unmanned vehicle from the server and controls the unmanned vehicle to run to the designated station.

In an embodiment, one of the above-mentioned abnormal condition coping strategies may be adopted according to specific conditions. In another embodiment, two of the abnormal condition coping strategies may be adopted at the same time: 1. controlling the alarm to give an alarm; and 2. controlling the unmanned vehicle to avoid at the same time through one of the following coping strategies: controlling the unmanned vehicle to run in the curve, controlling the unmanned vehicle to accelerate, and controlling the unmanned vehicle to run to the designated station. Therefore, the unmanned vehicle can be more effectively separated from the abnormal condition, and the safety of the unmanned vehicle is further improved.

In an embodiment, when the condition of the unmanned vehicle is abnormal, the abnormal condition coping strategy is determined by the controller, and the unmanned vehicle is controlled according to the abnormal condition coping strategy. The controller may obtain weather information, a road condition, a surrounding environment, and a scene of the unmanned vehicle through the camera and the server, and determine the abnormal condition coping strategy according to the above information. For example, when the unmanned vehicle is in a remote, unmanned or sparsely populated place, the controller controls the unmanned vehicle to accelerate or run in the curve to escape from the current position. When the unmanned vehicle is in a downtown area or crowded place, the controller controls the alarm to give an alarm, thus avoiding an accident caused by the acceleration of the unmanned vehicle. The alarm includes, but is not limited to an acousto-optic alarm. When the road condition and the weather are bad, the controller controls the unmanned vehicle to avoid, that is, to run forward or backward for a certain distance. The above only lists some examples, and is not limited to the above examples. Under the above circumstances, different abnormal condition coping strategies may also be adopted, and the specific strategies are not limited here.

In another embodiment, when the condition of the unmanned vehicle is abnormal, an instruction generated according to the abnormal condition coping strategy is received by the controller, and the unmanned vehicle is controlled by the controller according to the instruction. In an embodiment, the server determines the abnormal condition coping strategy, the server sends an instruction to the controller according to the determined abnormal condition coping strategy, and the controller controls the unmanned vehicle according to the received instruction. In this process, the server interacts with the controller. For example, through wireless communication, the controller transmits the video information (including the scene information of the unmanned vehicle) captured by the camera and positioning information of a GPS (Global Positioning System) to the server as basis for the server to determine the abnormal condition coping strategy. Meanwhile, when the server determines the abnormal condition coping strategy, a history of the server may also be called. For example, the server, according to the history thereof, determines that there is a designated station near the position where the unmanned vehicle is located. After analyzing the above related information, the server determines that the abnormal condition coping strategy is: to control the unmanned vehicle to run to the designated station; the server sends an instruction to the controller according to the coping strategy, and the controller controls the unmanned vehicle to run to the designated site after receiving the instruction.

In an embodiment, when the condition of the unmanned vehicle is abnormal, time when the unmanned vehicle has an abnormal condition is recorded, and the time when the unmanned vehicle has the abnormal condition, video information and a traveling track within a set time period before the abnormal condition are sent to the server. The video information is captured by the camera mounted on the unmanned vehicle, and the traveling track is provided by the GPS mounted on the unmanned vehicle. The set time period may be set to 5 to 20 minutes according to specific needs. For example, the set time period may be set to 6 minutes, 8 minutes, 10 minutes, 12 minutes, 14 minutes, or a certain value between any two adjacent ones, and is not limited to this. In this way, the intruders can be effectively avoided from destroying the video information captured by the camera and a motion track recorded by the GPS, and more direct clues for determining the intruder are provided.

Figure 3:
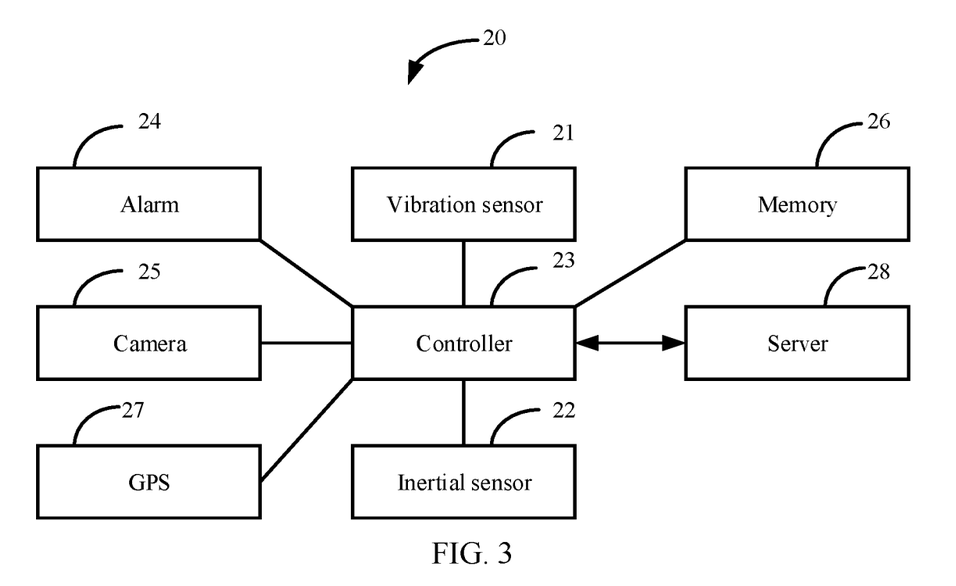
FIG. 3 is a block diagram of an unmanned vehicle according to an embodiment of this application.

FIG. 3 is a block diagram of an unmanned vehicle 20 according to an embodiment. The unmanned vehicle 20 includes a vibration sensor 21, an inertial sensor 22 and a controller 23. The vibration sensor 21 is configured to detect vibration information of the unmanned vehicle. The inertial sensor 22 is configured to detect running attitude information of the unmanned vehicle. The controller 23 is electrically connected to the vibration sensor 21 and the inertial sensor 22 respectively. The controller 23 is configured to, according to the vibration information, the running attitude information and a running status of the unmanned vehicle, determine a condition of the unmanned vehicle, and when the condition of the unmanned vehicle is abnormal, control the unmanned vehicle according to an abnormal condition coping strategy. The condition of the unmanned vehicle is determined according to the vibration information, the running attitude information and the running status of the unmanned vehicle, which can eliminate misjudgment of the controller caused by the vibration information with larger vibration amplitude detected by the vibration sensor due to factors such as bumping, acceleration and deceleration, resonance and the like during the running of the unmanned vehicle, so that the condition of the unmanned vehicle can be judged more accurately and the safety is improved.

The unmanned vehicle 20 further includes an alarm 24, and the controller 23 is electrically connected to the alarm 24. The alarm 24 includes, but is not limited to an acousto-optic alarm. A control system 20 of the unmanned vehicle further includes a camera 25, a memory 26 and a GPS 27. The controller 23 is electrically connected to the camera 25, the memory 26 and the GPS 27.

In an embodiment, the unmanned vehicle 20 further includes a server 28. The server 28 is electrically connected with the controller 23, and is configured to receive camera information and a traveling track. The server 28 is further configured to determine a coping strategy when the unmanned vehicle is in an abnormal status. In another embodiment, the unmanned vehicle 20 is wirelessly connected to the server 28 through a network, that is, the server 28 does not belong to an internal component of the unmanned vehicle 20. When the condition of the unmanned vehicle is abnormal, the controller 23 sends time when the abnormal condition occurs, video information and a traveling track within a set time period before the abnormal condition to the server 28 through an uplink. The server 28 determines the abnormal condition coping strategy according to the time when the abnormal condition occurs, the video information and the traveling track within the set time period before the abnormal condition, and a history, and sends an instruction corresponding to the determined abnormal condition coping strategy to the controller 23 through a downlink, so that the controller 23 controls the unmanned vehicle 20 according to the instruction.

The controller 23 is configured to, when the unmanned vehicle is in the stop status, and the vibration information is detected, determine that the condition of the unmanned vehicle is abnormal.

The controller 23 is configured to, when the unmanned vehicle is in the driving status, determine the condition of the unmanned vehicle by comparing the vibration information with the running attitude information. In an embodiment, the vibration information includes: a first direction and a first vibration amplitude, and the running attitude information includes: a second direction and second vibration amplitude. In such a case, the controller 23 is further configured to, when the first direction is different from the second direction, determine that the condition of the unmanned vehicle is abnormal; and when the first direction is the same as the second direction, determine the condition of the unmanned vehicle according to a difference between the first vibration amplitude and the second vibration amplitude. When the first direction is the same as the second direction, the controller 23 is further configured to: when the difference between the first vibration amplitude and the second vibration amplitude is greater than a vibration threshold, determine that the condition of the unmanned vehicle is abnormal.

The abnormal condition coping strategy includes at least one of: controlling an alarm 24 to give an alarm, controlling the unmanned vehicle to avoid, controlling the unmanned vehicle to run in a curve, controlling the unmanned vehicle to accelerate, or controlling the unmanned vehicle to run to a designated station. In an embodiment, when the condition of the unmanned vehicle is abnormal, the controller 23 is further configured to: according to weather information, a road condition, a surrounding environment, and a scene of the unmanned vehicle, determine the abnormal condition coping strategy.

The controller 23 is further configured to record time when the unmanned vehicle has an abnormal condition, and send the time when the unmanned vehicle has the abnormal condition, video information and a traveling track within a set time period before the abnormal condition to a server, receive an instruction sent by the server, and control the unmanned vehicle according to the instruction. The server 28 is configured to determine the abnormal condition coping strategy according to the time when the unmanned vehicle has the abnormal condition, the video information and the traveling track within the set time period before the abnormal condition, and a history; and generate the instruction according to the abnormal condition coping strategy.

The controller 23 is further configured to, according to the running attitude information and a system instruction for indicating a designated running status of the unmanned vehicle, determine the running status of the unmanned vehicle.

The above descriptions are merely preferred embodiments of the embodiments of the present disclosure, but are not intended to limit the embodiments of the present disclosure. Any modification, equivalent replacement, or improvement made within the spirit and principle of the present disclosure shall fall within the protection scope of the embodiments of the present disclosure.

The invention claimed is:

1. A control method of an unmanned vehicle, comprising:
    detecting vibration information and running attitude information of the unmanned vehicle;
    determining a condition of the unmanned vehicle according to the vibration information, the running attitude information and a running status of the unmanned vehicle, wherein the running status of the unmanned vehicle comprises a stop status and a driving status; and
    controlling the unmanned vehicle according to an abnormal condition coping strategy when the condition of the unmanned vehicle is abnormal,
    wherein the determining the condition of the unmanned vehicle according to the vibration information, the running attitude information and the running status of the unmanned vehicle, comprises:
    determining that the condition of the unmanned vehicle is abnormal when the unmanned vehicle is in the stop status and the vibration information is detected.

2. The method according to claim 1, further comprising:
    determining the running status of the unmanned vehicle according to the running attitude information and a system instruction for indicating a designated running status of the unmanned vehicle.

3. The method according to claim 1, wherein determining the condition of the unmanned vehicle according to the vibration information, the running attitude information and the running status of the unmanned vehicle, comprises:

determining the condition of the unmanned vehicle by comparing the vibration information with the running attitude information when the unmanned vehicle is in the driving status.

4. The method according to claim 3, wherein the vibration information comprises a first direction and a first vibration amplitude, and the running attitude information comprises a second direction and a second vibration amplitude; and the determining the condition of the unmanned vehicle by comparing the vibration information with the running attitude information when the unmanned vehicle is in the driving status, comprises:

determining that the condition of the unmanned vehicle is abnormal when the first direction is different from the second direction; and determining the condition of the unmanned vehicle according to a difference between the first vibration amplitude and the second vibration amplitude when the first direction is the same as the second direction.

5. The method according to claim 4, wherein determining the condition of the unmanned vehicle according to the difference between the first vibration amplitude and the second vibration amplitude when the first direction is the same as the second direction, comprises:

determining that the condition of the unmanned vehicle is abnormal when the difference between the first vibration amplitude and the second vibration amplitude is greater than a vibration threshold.

6. The method according to claim 1, wherein the abnormal condition coping strategy comprises at least one of:

controlling an alarm on the unmanned vehicle to give an alarm;
controlling the unmanned vehicle to avoid;
controlling the unmanned vehicle to run in a curve;
controlling the unmanned vehicle to accelerate; or controlling the unmanned vehicle to run to a designated station.

7. The method according to claim 6, wherein controlling the unmanned vehicle according to the abnormal condition coping strategy when the condition of the unmanned vehicle is abnormal, comprises:

determining the abnormal condition coping strategy by a controller of the unmanned vehicle, and controlling the unmanned vehicle according to the abnormal condition coping strategy; or receiving an instruction generated according to the abnormal condition coping strategy by the controller of the unmanned vehicle, and controlling the unmanned vehicle based on the instruction.

8. The method according to claim 6, further comprising:
determining the abnormal condition coping strategy according to weather information, a road condition, a surrounding environment, and a scene of the unmanned vehicle.

9. The method according to claim 1, further comprising:
recording time when the unmanned vehicle has an abnormal condition, and sending the time when the unmanned vehicle has the abnormal condition, video information and a traveling track within a set time period before the abnormal condition to a server.

10. An unmanned vehicle, comprising:
a vibration sensor configured to detect vibration information of the unmanned vehicle;
an inertial sensor configured to detect running attitude information of the unmanned vehicle; and a controller electrically connected to the vibration sensor and the inertial sensor respectively, and configured to:
determine a condition of the unmanned vehicle according to the vibration information, the running attitude information and a running status of the unmanned vehicle, wherein the running status of the unmanned vehicle comprises a stop status and a driving status; and
control the unmanned vehicle according to an abnormal condition coping strategy when the condition of the unmanned vehicle is abnormal, wherein the controller is further configured to:
determine that the condition of the unmanned vehicle is abnormal when the unmanned vehicle is in the stop status, and the vibration information is detected.

11. The unmanned vehicle according to claim 10, wherein the controller is further configured to:
determine the condition of the unmanned vehicle by comparing the vibration information with the running attitude information when the unmanned vehicle is in the driving status.

12. The unmanned vehicle according to claim 11, wherein the vibration information comprises a first direction and a first vibration amplitude, and the running attitude information comprises a second direction and a second vibration amplitude; and the controller is further configured to:
determine that the condition of the unmanned vehicle is abnormal when the first direction is different from the second direction; and
determine the condition of the unmanned vehicle according to a difference between the first vibration amplitude and the second vibration amplitude when the first direction is the same as the second direction.

13. The unmanned vehicle according to claim 12, wherein when the first direction is the same as the second direction, the controller is further configured to:
determine that the condition of the unmanned vehicle is abnormal when the difference between the first vibration amplitude and the second vibration amplitude is greater than a vibration threshold.

14. The unmanned vehicle according to claim 10, wherein the abnormal condition coping strategy comprises at least one of:
controlling an alarm mounted on the unmanned vehicle to give an alarm;
controlling the unmanned vehicle to avoid;
controlling the unmanned vehicle to run in a curve;
controlling the unmanned vehicle to accelerate; or
controlling the unmanned vehicle to run to a designated station.

15. The unmanned vehicle according to claim 14, wherein when the condition of the unmanned vehicle is abnormal, the controller is further configured to:
determine the abnormal condition coping strategy according to weather information, a road condition, a surrounding environment, and a scene of the unmanned vehicle.

16. The unmanned vehicle according to claim 10, wherein the controller is further configured to:
record time when the unmanned vehicle has an abnormal condition;
send the time when the unmanned vehicle has the abnormal condition, video information and a traveling track within a set time period before the abnormal condition to a server;

receive an instruction sent by the server, wherein the server is configured to:
determine the abnormal condition coping strategy according to the time when the unmanned vehicle has the abnormal condition, the video information and the traveling track within the set time period before the abnormal condition, and a history; and
generate the instruction according to the abnormal condition coping strategy; and
control the unmanned vehicle according to the instruction.

17. The unmanned vehicle according to claim 10, wherein the controller is further configured to:
determine the running status of the unmanned vehicle according to the running attitude information and a system instruction for indicating a designated running status of the unmanned vehicle.

* * * * *